US010770881B2

(12) United States Patent
Li et al.

(10) Patent No.: US 10,770,881 B2
(45) Date of Patent: Sep. 8, 2020

(54) SYSTEMS AND METHODS FOR SCRIPT IMPLEMENTED LOGIC FOR TRIGGER FOR CONVERTING ELECTROMECHANICAL RELAY OUTPUTS INTO FAULT INDICATION FOR AUTOMATIC RESTORATION APPLICATION

(71) Applicant: PPL Corporation, Allentown, PA (US)

(72) Inventors: Yi Li, Allentown, PA (US); Christopher Menges, Allentown, PA (US)

(73) Assignee: PPL CORPORATION, Allentown, PA (US)

( * ) Notice: Subject to any disclaimer, the term of this patent is extended or adjusted under 35 U.S.C. 154(b) by 428 days.

(21) Appl. No.: 15/857,133

(22) Filed: Dec. 28, 2017

(65) Prior Publication Data
US 2019/0207377 A1 Jul. 4, 2019

(51) Int. Cl.
*H02H 3/06* (2006.01)
*H02H 3/05* (2006.01)
*H02H 1/00* (2006.01)
*H02H 3/20* (2006.01)

(52) U.S. Cl.
CPC ............ *H02H 3/06* (2013.01); *H02H 1/0007* (2013.01); *H02H 3/05* (2013.01); *H02H 3/20* (2013.01)

(58) Field of Classification Search
CPC ...... H02H 1/0007; H02H 1/0092; H02H 3/05; H02H 3/06; H02H 3/20

USPC .......................................................... 361/71
See application file for complete search history.

(56) References Cited

U.S. PATENT DOCUMENTS

| | | | |
|---|---|---|---|
| 6,201,676 B1* | 3/2001 | Glaser .................. | H01H 71/443 361/202 |
| 6,282,499 B1* | 8/2001 | Andersen ............. | H01H 1/0015 361/63 |
| 2005/0097373 A1* | 5/2005 | Stoupis ............. | H02J 13/00019 713/300 |

* cited by examiner

*Primary Examiner* — Kevin J Comber
(74) *Attorney, Agent, or Firm* — Haynes and Boone LLP

(57) ABSTRACT

A system for automatic power outage restoration includes a conversion module, the conversion module receiving relay package input from an electro-mechanical relay package and executing code to convert the relay package input to readable output transmitted to an automatic outage restoration system. The conversion module is configured to receive the relay package input and determine whether a circuit breaker corresponding to the electro-mechanical relay package is opened manually. The conversion module is further configured to determine whether a non-fault scenario has occurred at the circuit breaker and determine whether a time from an opening of the circuit breaker has been more than a preset time. The conversion module is further configured to, based on determining that the circuit breaker was not opened manually, that a non-fault scenario has not occurred, and that the time has not been more than the preset time, outputting a set signal from the conversion module, wherein an automatic outage restoration application resets the circuit breaker based on the set signal.

21 Claims, 5 Drawing Sheets

SYSTEMS AND METHODS FOR SCRIPT IMPLEMENTED LOGIC FOR TRIGGER FOR CONVERTING ELECTROMECHANICAL RELAY OUTPUTS INTO FAULT INDICATION FOR AUTOMATIC RESTORATION APPLICATION

BACKGROUND

Distribution system nowadays are usually equipped with protection devices with remote communication capabilities such as circuit breaker (CB) and line devices that are capable of providing sectionalizing, switching, reclosing features or any combination of these capabilities. Most of the CBs inside the substations have been equipped with electro-mechanical relays, which is a cost effective solution that can trip and reclose based on pre-configured intervals and times to de-energize a distribution power line in the event of possible line failure. In recent years, more advanced relay packages are installed in replacement of the electro-mechanical relays but the percentage of the older style relay is still very high in common distribution system due to cost. On another front, with increasing amount of distribution automation and protection equipment added to the distribution circuits, the complexity of the optimized control of such equipment in responding to an outage is calling for automatic switching schemes that can cut down switching time and increase efficiency. Generally, such automated switching schemes can be deployed based on utility preference using one of three philosophies:

The first one is "Centralized Control" whereby; all the inputs, solution algorithms, and control actions are handled by a "central" control system. An interface is created to allow users, in a control center, to interact with the software;

The second approach is "De-centralized Control"; whereby the inputs, solution scripts, and control actions are handled locally by a controller located in a distribution substation or other convenient location. An interface is created to allow users, in a control center, to interact with the software;

The last approach is "Hybrid Control"; whereby a combination of the above philosophies is deployed to restore different sections of a circuit, usually being upstream (restore from the normal source) and downstream (restore from a neighboring circuit).

The requirements from vendors that provide any of these systems are quite clear and standard: Valid system modeling including current status of all devices is needed. Valid fault sensing inputs, typically requiring a fault indication at each device to be considered in the scheme; Controllability of all devices in the scheme, which requires robust communication infrastructure; Failure sensing mechanisms, which are necessary to such system to tell if fault detection or switching device should be rendered ineligible.

Given the hardware limitation of electro-mechanical relays where they do not possess valid fault indication, which is one of the key requirement for enabling such automatic switching systems, Distribution Utilities seeking to deploy one of these switching systems are finding themselves in a quandary between not deploying the automatic restoration system on some circuits due to lack of qualified input information or spending capitol dollars to upgrade older devices (feeder breakers or line reclosers) or install standalone fault sensing equipment, and commonly having to go through a very lengthy process for such upgrades.

BRIEF SUMMARY

In one embodiment, a system for automatic power outage restoration includes a conversion module, the conversion module receiving relay package input from an electro-mechanical relay package and executing code to convert the relay package input to readable output transmitted to an automatic outage restoration system. The conversion module is configured to receive the relay package input and determine whether a circuit breaker corresponding to the electro-mechanical relay package is opened manually. The conversion module is further configured to determine whether a non-fault scenario has occurred at the circuit breaker and determine whether a time from an opening of the circuit breaker has been more than a preset time. The conversion module is further configured to, based on determining that the circuit breaker was not opened manually, that a non-fault scenario has not occurred, and that the time has not been more than the preset time, outputting a set signal from the conversion module, wherein an automatic outage restoration application resets the circuit breaker based on the set signal. In one alternative, the non-fault scenario is a scenario where the circuit breaker trips due to a neutral amperage higher than a preset limit. In another alternative, the preset time is sixty seconds. Alternatively, the automatic restoration system is configured to restore power and the circuit breaker is in an unset state.

In one embodiment, a system for automatic power outage restoration includes a conversion module, the conversion module receiving relay package input from an electro-mechanical relay package and executing code to convert the relay package input to readable output transmitted to an automatic outage restoration system. The conversion module is configured to receive the relay package input and determine that a circuit breaker corresponding to the electro-mechanical relay package has not been opened manually. The conversion module is further configured to determine that a non-fault scenario has not occurred at the circuit breaker and determine that a time from an opening of the circuit breaker has not been more than a preset time. The conversion module is further configured to output a set signal from the conversion module, wherein an automatic outage restoration application resets the circuit breaker based on the set signal. In one alternative, the non-fault scenario is a scenario where the circuit breaker trips due to a neutral amperage higher than a preset limit. In another alternative, the preset time is sixty seconds.

In one embodiment, a system for automatic power outage restoration includes a conversion module, the conversion module receiving relay package input from an electro-mechanical relay package and executing code to convert the relay package input to readable output transmitted to an automatic outage restoration system. The conversion module is configured to receive the relay package input and determine that a circuit breaker corresponding to the electro-mechanical relay package has not been opened manually. The conversion module is further configured to determine that a current time is less than a preset circuit breaker status time from a time stamp of the relay package input and determine that the frequency of the circuit breaker has not decreased below a preset frequency limit. The conversion module is further configured to determine that a neutral current limit has not been exceeded within a preset neutral current time and determine that a current on a circuit breaker phase does not exceed a preset phase indicator. The conversion module is further configured to output a set signal from the conversion module, wherein an automatic outage restoration application resets the circuit breaker based on the set signal. In one alternative, the preset circuit breaker status time is one minute. In another alternative, the preset frequency limit is measured by a under frequency relay and the under frequency relay indicates "OPER" when the frequency is below the preset frequency limit. Alternatively, the preset neutral current time is ten minutes. In another alternative, the preset phase indicator is 10.

In one embodiment, a method for automatic power outage restoration includes providing a conversion module, the conversion module receiving relay package input from an electro-mechanical relay package and executing code to convert the relay package input to readable output transmitted to an automatic outage restoration system. The method further includes receiving the relay package input at the conversion module and determining, at the conversion module, that a circuit breaker corresponding to the electro-mechanical relay package has not been opened manually. The method further includes determining, at the conversion module, that a non-fault scenario has not occurred at the circuit breaker and determining, at the conversion module, that a time from an opening of the circuit breaker has not been more than a preset time. The method further includes outputting a set signal from the conversion module, wherein an automatic outage restoration application resets the circuit breaker based on the set signal. Alternatively, the non-fault scenario is a scenario where the circuit breaker trips due to a neutral amperage higher than a preset limit. In one alternative, the preset time is less than sixty seconds.

In one embodiment, a non-transitory digital storage medium having a computer program stored thereon to perform the method for processing an audio signal. The method further includes receiving the relay package input at the conversion module and determining, at the conversion module, that a circuit breaker corresponding to the electro-mechanical relay package has not been opened manually. The method further includes determining, at the conversion module, that a non-fault scenario has not occurred at the circuit breaker and determining, at the conversion module, that a time from an opening of the circuit breaker has not been more than a preset time. The method further includes outputting a set signal from the conversion module, wherein an automatic outage restoration application resets the circuit breaker based on the set signal.

In one embodiment, a system for automatic power outage restoration includes a circuit breaker and an electro-mechanical relay package, connected to the circuit breaker. The system further includes an automatic outage restoration system, the automatic outage restoration system configured to reset the circuit via the electro-mechanical relay package. The system further includes a conversion module, the conversion module receiving relay package input from the electro-mechanical relay package and executing code to convert the relay package input to readable output transmitted to the automatic outage restoration system. The conversion module is configured to receive the relay package input and determine whether a circuit breaker corresponding to the electro-mechanical relay package is opened manually. The conversion module is further configured to determine whether a non-fault scenario has occurred at the circuit breaker and determine whether a time from an opening of the circuit breaker has been more than a preset time. The conversion module is further configured to, based on determining that the circuit breaker was not opened manually, that a non-fault scenario has not occurred, and that the time has not been more than the preset time, outputting a set signal from the conversion module, wherein an automatic outage restoration application resets the circuit breaker based on the set signal. In one alternative, the non-fault scenario is a scenario where the circuit breaker trips due to a neutral amperage higher than a preset limit. In another alternative, the preset time is sixty seconds.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure.

DETAILED DESCRIPTION

Figure 1:
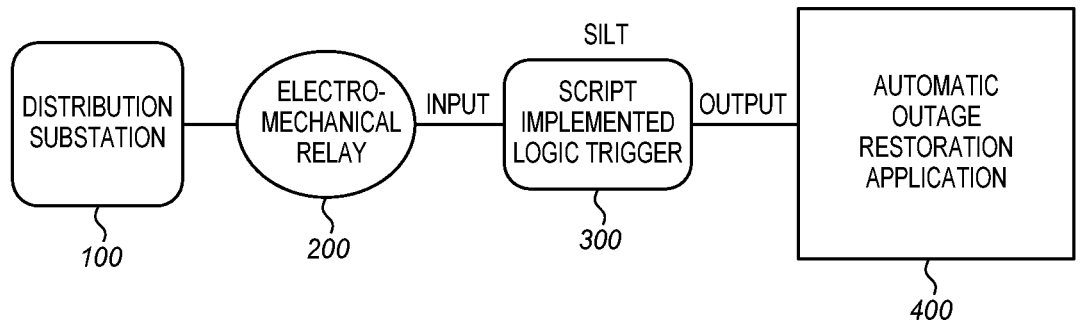
FIG. 1 shows a block diagram of one embodiment of a script implemented logic trigger and associated systems.

Certain terminology is used herein for convenience only and is not to be taken as a limitation on the embodiments of the systems and methods for script implemented logic for trigger for converting electromechanical relay outputs into fault indication for automatic restoration application. Embodiments are generally described as systems and methods automatic power outage restoration, with subcomponents being described as script implemented logic triggers (SILT). In the drawings, the same reference letters are employed for designating the same elements throughout the several figures.

A primary aspect of the systems and methods automatic power outage restoration is to design and build a script-based logic to combine inputs from electro-mechanical relay, which include digital inputs with binary states and analog inputs that capture circuit characteristics, and convert to logical output with binary state that can be easily incorporated and understood by any automatic switching application. The goal is for this logic to be standard and accommodating for all legacy relays and automatic switching application. With such logic implemented, utilities no longer need to implement or expedite hardware upgrade to all their legacy relay packages and can deploy all circuits under the automatic restoration application and maximize the operation and reliability benefits in implementing such system.

Such output is defined and referred to as a "Script Implemented Logic Trigger" (SILT) point and has two valid states: SET (1) and UNSET (0). In one embodiment, three main requirements are used when creating the SILT point:

1. The trigger point must not get set if the device is opened manually by a user;
2. The trigger point must not set for non-fault scenarios, where the Circuit Breaker trips because it detects a neutral amp higher than the limit, which generally indicates a downed conductor, classified as non-fault scenarios that are generally unsafe to automatically restore without a detailed line inspection.
3. The trigger point must set within the first minute of an outage, which is intended to perform any restoration switching before trouble crews get on the trouble site and ensure their safety.

The logic design of the trigger point is based on a set of rules for both the SET (1) and UNSET (0) states of such point, the computation evaluation of the SILT point runs every 60 seconds unless one of the monitored binary point changes status.

FIG. 1 shows a block diagram of such design logic, where the logic itself is a key interconnection point from two components. The sending end is the electro-mechanical relay package (200), which is a hardware installation within the distribution substation and does not possess flexibility in terms of what to output; the receiving end is the vendor deployed automatic outage restoration system (400), which is a software living in distribution control center and does not possess flexibility in terms what to accept as inputs. Both systems are not easily upgradeable or switchable. To remedy this issue, the SILT, a middleware logic box (300), is provided in many embodiments.

Figure 2:
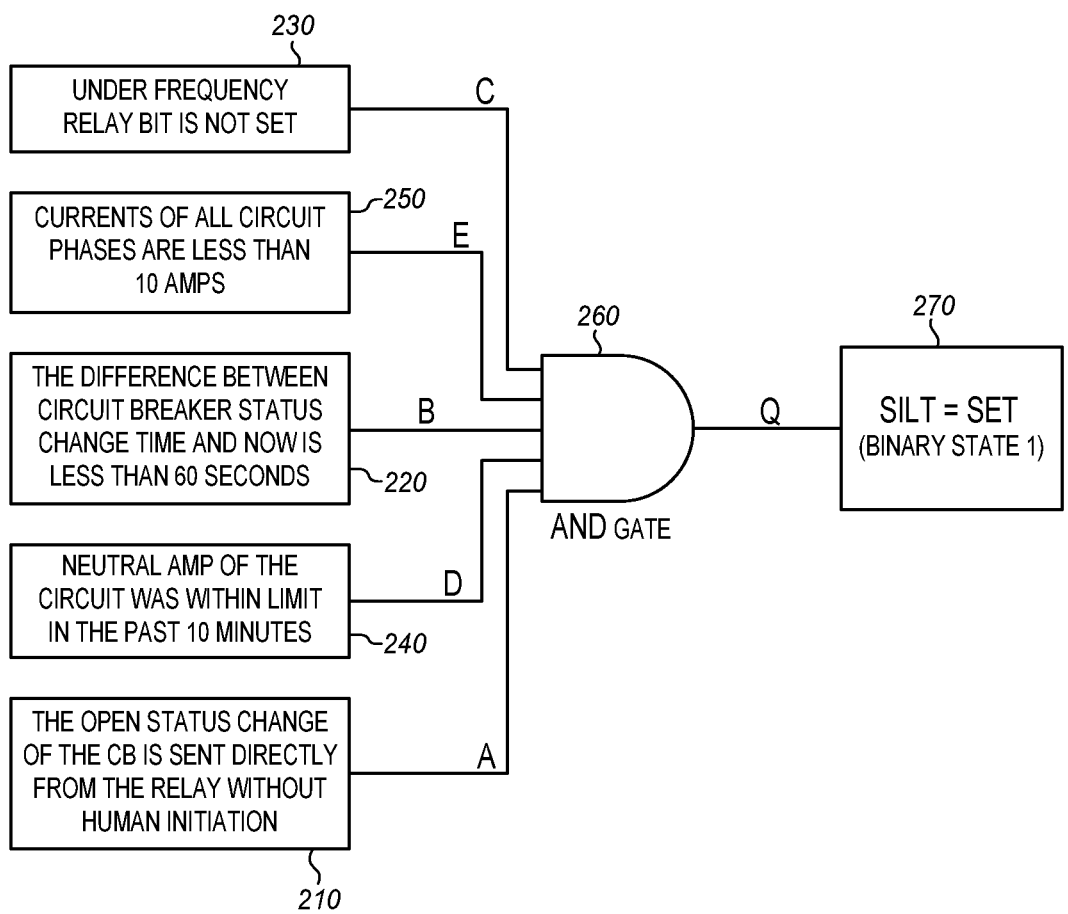
FIG. 2 shows one embodiment of a gate logic that describes under which logic conditions such trigger point will get SET.

FIG. 2 is a demonstration of what rules are required for the relay outputs to meet in order for the SILT point to go SET or enter the binary state of 1. The AND gate logic diagram is being used to capture the rules to show the point can only get SET when all the input conditions from A through E need to be satisfied.

The Rule A 210 is a requirement for Circuit breaker (CB) to be opened unsolicited (not controlled by user intentional). This rule is in place to avoid false indication when user operate devices intentionally and do not wish the line to get automatically restored.

The Rule B 220 is a requirement where the time stamp of the CB status changes need to be within 1 minute from current time. This rule is in place to ensure any ancient status change does not trigger further automatic restoration as the system state, loading levels and crew location are not fully visible to the system.

The Rule C 230 is a requirement where the Under Frequency (UF) Relay is not in "OPER". The UF Relay is a solid-state device that functions to protect the load in the event the system frequency decreases below preset limits. The relay will go into the "OPER" state when such limit is violated. This rule is in place to avoid automatic restoration when line has under frequency and needs further attention and investigation.

The Rule D 240 is a requirement where Neutral Current Limit has not been exceeded within the previous 10 minutes. This rule is in place to avoid automatic restoration when there is an indication of downed conductor on the circuit and needs further investigation.

The Rule E 250 is a requirement where current on any CB phase does not exceed 10. This rule is in place to avoid triggering for Supervisory Control and Data Acquisition (SCADA) system malfunctions in possessing and sending relay outputs back.

Signals of true or false (1 or 0) are feed from each rule output. The AND Gate 260 determines whether all of the rules yield a true. If they do, then the SILT provides a Set state (of 1) in block 270.

Figure 3:
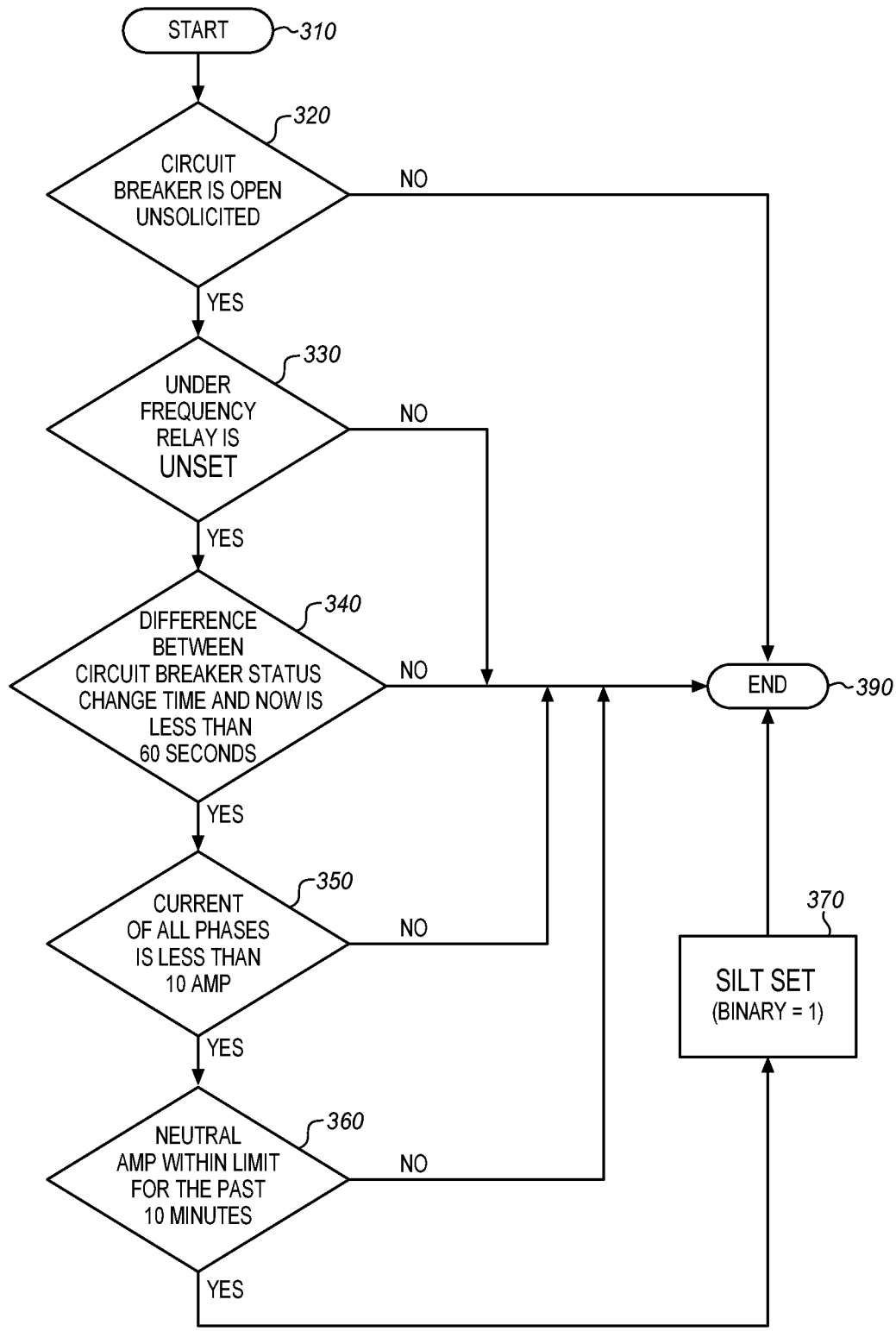
FIG. 3 shows one embodiment of a flow diagram that explains the gate logic captured in FIG. 2 in a sequential way.

FIG. 3 shows one embodiment of a flow chart to explain the logic of the AND gate logic. From start block 310, in decision block 320, it is determined whether the circuit breaker is opened in an unsolicited fashion. This means, has an individual affirmatively selected to open the circuit breaker. If no, then flow proceeds to end block 390. In block 330, it is determined whether the under frequency relay is in OPER. If it is, then the flow proceeds to end block 390. If not, in decision block 340 it is determined whether the current time and the status time of the circuit breaker is less than 60 seconds. If it is not, then the flow proceeds to end block 390. Otherwise, in block 350, it is determined whether the current is less than 10 amps. If it is not, then the flow proceeds to end block 390. Otherwise, in block 360, it is determined whether the neutral amperage was within the limit for the last 10 minutes. If it was, then the SILT goes to a set state (binary 1) in block 370. Then the flow proceeds to end block 390.

Figure 4:
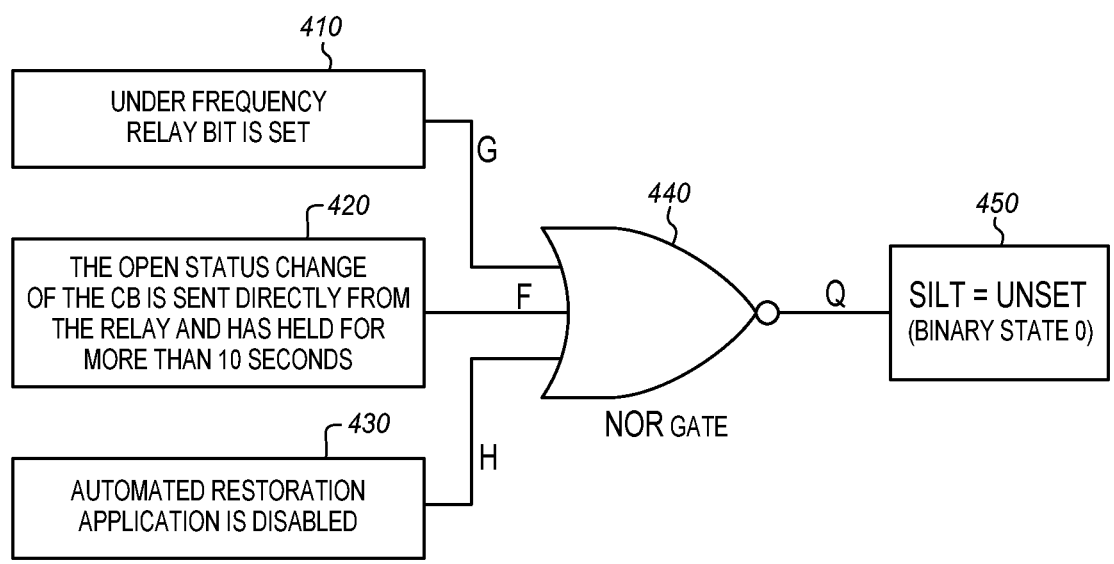
FIG. 4 shows one embodiment of a gate logic which describes under which logic conditions such trigger point will get UNSET.

In addition to the SILT providing a SET indication, the SILT may provide a UNSET (binary 0) indication. FIG. 4 is one embodiment of a demonstration of what rules regarding the relay outputs can get the SILT point to go UNSET or enter the binary state of 0. The NOR gate logic diagram is being used to capture the rules to show the point can get SET when any input conditions from F through H is satisfied. The UNSET indication occurs when the fault or other issue with power transmission has been resolved and the system should no longer provide for isolation of fault or otherwise disabled area.

The Rule F 420 is the condition where CB has been closed for more than 10 seconds. This indicates the line has been restored and fault has been cleared. If the power has been restored, then it is not desirable to unset the circuit breaker.

The Rule G 410 is the condition where the UF Relay is in "OPER." If the UF Relay is indicating "OPER" then this indicates the line has under frequency issue and needs further attention and investigation. Therefore, automatic restoration may not function.

The Rule H 430 is when the automatic restoration application gets disabled by user on the circuit or when the line is no longer in need of restoration. This could be due to a change of line or crew condition that prompts user to disable such automation and obtain sole user control. When the line is fixed and the fault or other issue is repaired then there is no need for the automatic restoration system to function. According to any of the rules, if any of the criteria are true or a binary 1, then the NOR gate 440 will receive a 1 and cause the SILT to provide an unset (or zero) indication in block 450.

Figure 5:
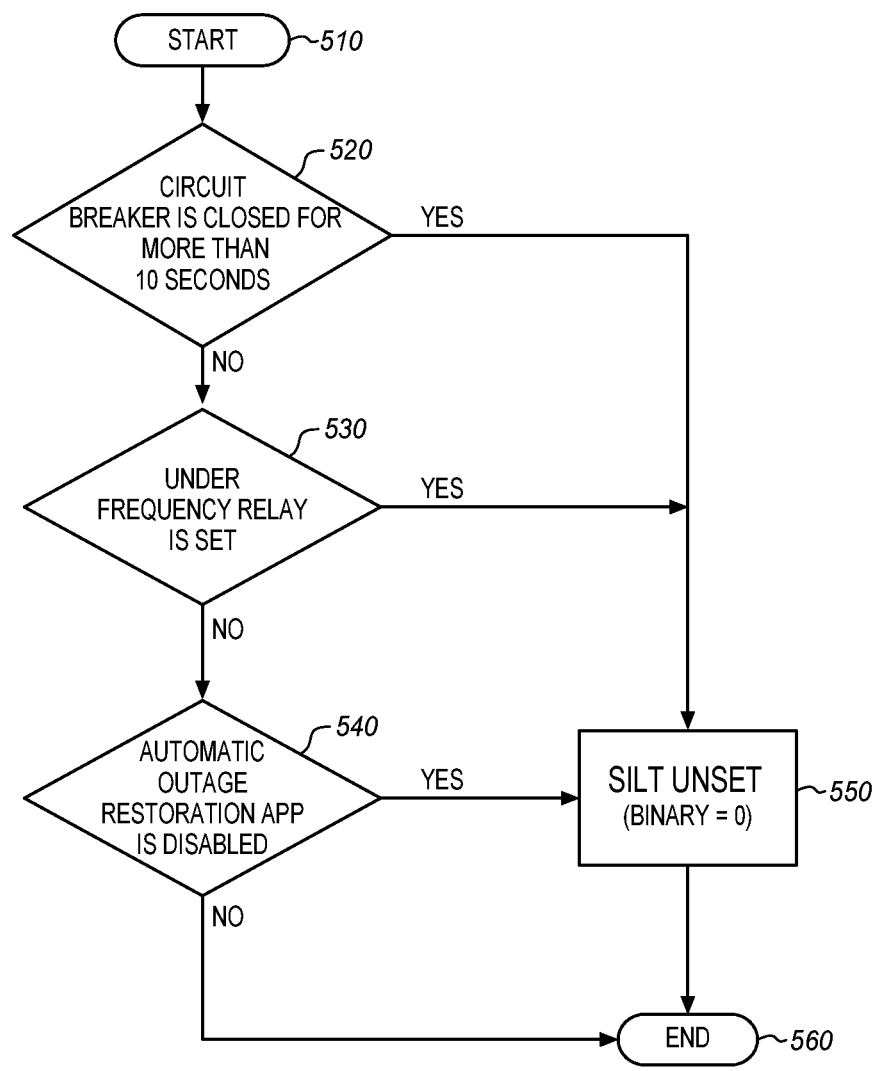
FIG. 5 shows one embodiment of a flow diagram that explains that gate logic captured in FIG. 4 in a sequential way.

FIG. 5 provides one embodiment of a flow chart for the NOR gate logic of FIG. 4. Working from the Start block 510, at decision block 520, it is determined whether the circuit breaker is closed for more than 10 seconds. If this is true, then flow proceeds to block 550 where the SILT is modified to output an unset or binary zero. Otherwise, flow proceeds to block 530 where it is determined whether the under frequency is in OPER. If this is true, then flow proceeds to block 550 where the SILT is modified to output an unset or binary zero. Otherwise, flow proceeds to block 540 where it is determined whether the automatic outage restoration app is disabled. If this is true, then flow proceeds to block 550 where the SILT is modified to output an unset or binary zero.

Otherwise, flow proceeds to block 560 where the process is ended. These steps may occur in an alternative order and this is merely exemplary.

In support to FIG. 2 and FIG. 4, FIG. 3 and FIG. 5 are both flow diagrams that describe under which rules that SILT point will get SET or UNSET, such diagram further demonstrate the distinction that all 5 rules from A through E have to be satisfied before the point get SET, while the failure of any rule's satisfaction among E through H can get the point to get UNSET. Any rule disaffection within the process will either get the logic to end or proceed to the next step.

Figure 6:
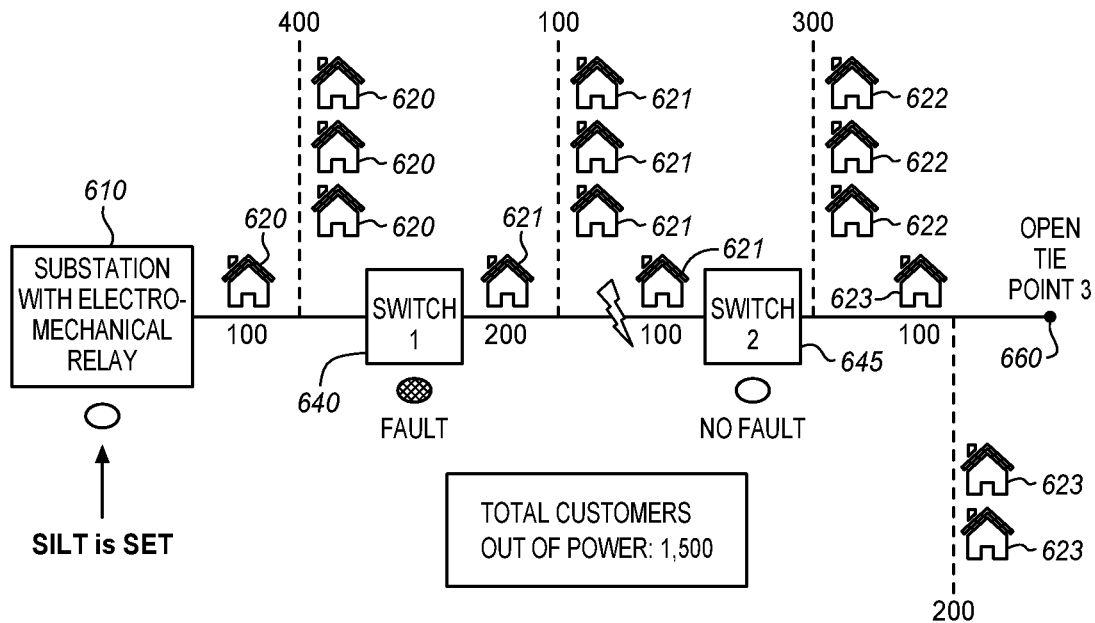
FIG. 6 shows one embodiment of a schematic view of a typical distribution circuit, sourced from its normal sourcing substation and feeding down to customers under the condition of a line outage.
Figure 7:
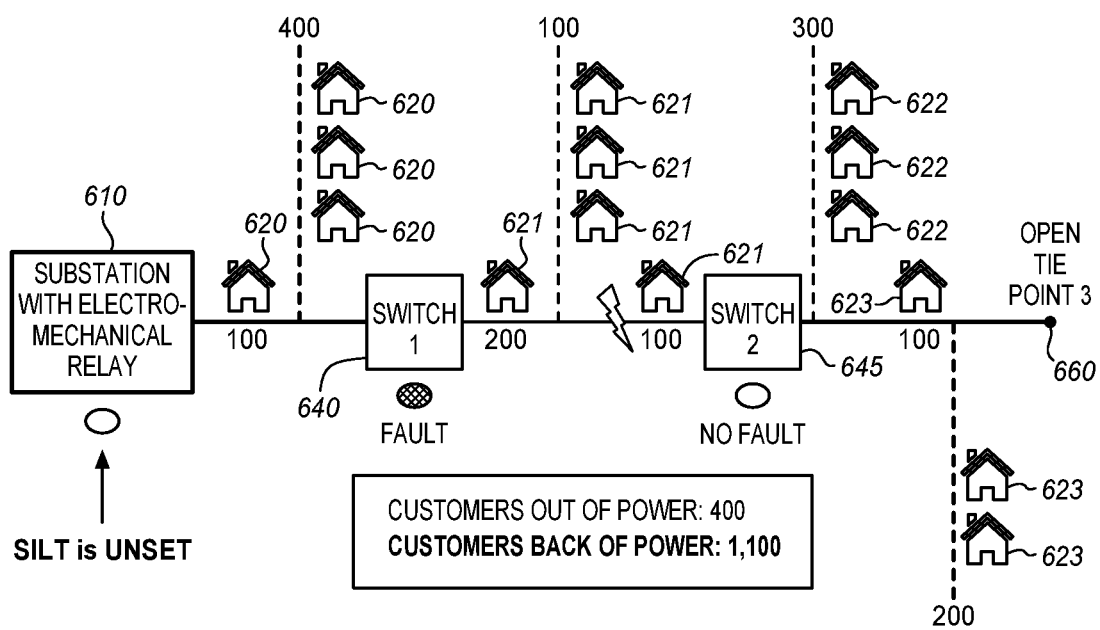
FIG. 7 shows one embodiment of a schematic view of a typical distribution circuit, sourced from both its normal and neighboring substation post the effect of automatic outage restoration.

In follow up to the logic design and rules description, FIG. 6 and FIG. 7 are presented to further demonstrate how the logic gets played out in the system operation and why it is necessary.

FIG. 6 depicts one embodiment of a simplified view of a typical distribution circuit sourced from a substation with electro-mechanical relay protection package equipped. This relay package is inherent in older substation designs and does not produce a fault indicating trigger, which is needed to start the automatic restoration application within DMS (distribution management system). The absence of said trigger would render any circuit with electro-mechanical relays deployed unavailable for automatic restoration application. From left to right this diagram begins with the substation 610 also referred to as the source. This source 610 is providing power to 1500 homes, 620-623 in various segments, which are broken out by customer count and displayed via real numbers. Also along this circuit are two switches 640, 645 with Fault Indication (FI). This fault indication is critical to the automatic restoration application, as it is used to accurately detect and locate faults on the distribution circuit. In this diagram there is a single fault 650 between Switch 1 640 and Switch 2 645 which is visually depicted by the lightning bolt. DMS would receive an uncommented trip of the Circuit Breaker (CB) as the fault is cleared by the electro-mechanical relay set de-energizing all 1500 customers. In this scenario Switch 1 640 indicates fault and Switch 2 645 does not, this is expected indication as the fault would not have been observed by the Switch 2, in the scenario where the electro-mechanical relay does not indicate fault, the automatic restoration will not get initiated.

However, with the designed logic, the SILT point would be Set after confirming all rules discussed prior are satisfied and thus complete the fault indication mapping of the entire circuit. With such mapping, the automatic restoration application will make the intelligent decision that the fault is between Switch 1 640 and Switch 2 645, and performs the isolation steps by opening the two switches and restoration switching steps by closing the CB and the normally open Tie Point 660 to restore power to 1,100 customers, homes 620, 622, 623. Tie Point 660 provides another path for the distribution of electricity to the homes 622, 623. Homes 621 remain without power as the switch 1 640 and switch 2 645 remain closed until the problem is resolved. As demonstrated in FIG. 7, such process is critical to customer reliability as it restores power automatically without human intervention to 1,100 customers and sets a foundation to further investigate what causes the fault in order to restore power for the remaining 400 customers.

In many embodiments, parts of the system are provided in devices including microprocessors. Various embodiments of the systems and methods described herein may be implemented fully or partially in software and/or firmware. This software and/or firmware may take the form of instructions contained in or on a non-transitory computer-readable storage medium. Those instructions then may be read and executed by one or more processors to enable performance of the operations described herein. The instructions may be in any suitable form such as, but not limited to, source code, compiled code, interpreted code, executable code, static code, dynamic code, and the like. Such a computer-readable medium may include any tangible non-transitory medium for storing information in a form readable by one or more computers such as, but not limited to, read only memory (ROM); random access memory (RAM); magnetic disk storage media; optical storage media; a flash memory, etc.

Embodiments of the systems and methods described herein may be implemented in a variety of systems including, but not limited to, smartphones, tablets, laptops, and combinations of computing devices and cloud computing resources. For instance, portions of the operations may occur in one device, and other operations may occur at a remote location, such as a remote server or servers. For instance, the collection of the data may occur at a smartphone, and the data analysis may occur at a server or in a cloud computing resource. Any single computing device or combination of computing devices may execute the methods described.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein but is intended to cover modifications within the spirit and scope thereof as defined by the appended claims and any and all equivalents thereof.

What is claimed as new and desired to be protected by Letters Patent of the United States is:

1. A system for automatic power outage restoration, the system comprising:
    a conversion module, the conversion module receiving relay package input from an electro-mechanical relay package and executing code to convert the relay package input to readable output transmitted to an automatic outage restoration system, the conversion module is configured to receive the relay package input;
    determine whether a circuit breaker corresponding to the electro-mechanical relay package is opened manually;
    determine whether a non-fault scenario has occurred at the circuit breaker;
    determine whether a time from an opening of the circuit breaker has been more than a preset time; and
    based on determining that the circuit breaker was not opened manually, that a non-fault scenario has not occurred, and that the time has not been more than the preset time, outputting a set signal from the conversion module, wherein an automatic outage restoration application resets the circuit breaker based on the set signal.

2. The system of claim 1, wherein the non-fault scenario is a scenario where the circuit breaker trips due to a neutral amperage higher than a preset limit.

3. The system of claim 1, wherein the preset time is sixty seconds.

4. The system of claim 1, wherein the automatic restoration system is configured to restore power, and wherein the circuit breaker is in an unset state.

5. A system for automatic power outage restoration, the system comprising:
    a conversion module, the conversion module receiving relay package input from an electro-mechanical relay package and executing code to convert the relay package input to readable output transmitted to an automatic outage restoration system, the conversion module is configured to receive the relay package input;

determine that a circuit breaker corresponding to the electro-mechanical relay package has not been opened manually;

determine that a non-fault scenario has not occurred at the circuit breaker;

determine that a time from an opening of the circuit breaker has not been more than a preset time; and output a set signal from the conversion module based on the determinations, wherein an automatic outage restoration application resets the circuit breaker based on the set signal.

6. The system of claim 5, wherein the non-fault scenario is a scenario where the circuit breaker trips due to a neutral amperage higher than a preset limit.

7. The system of claim 5, wherein the preset time is sixty seconds.

8. A system for automatic power outage restoration, the system comprising:

a conversion module, the conversion module receiving relay package input from an electro-mechanical relay package and executing code to convert the relay package input to readable output transmitted to an automatic outage restoration system, the conversion module is configured to receive the relay package input;

determine that a circuit breaker corresponding to the electro-mechanical relay package has not been opened manually;

determine that a current time is less than a preset circuit breaker status time from a time stamp of the relay package input;

determine that the frequency of the circuit breaker has not decreased below a preset frequency limit;

determine that a neutral current limit has not been exceeded within a preset neutral current time;

determine that a current on a circuit breaker phase does not exceed a preset phase indicator; and output a set signal from the conversion module based on the determinations, wherein an automatic outage restoration application resets the circuit breaker based on the set signal.

9. The system of claim 8, wherein the preset circuit breaker status time is one minute.

10. The system of claim 8, wherein the preset frequency limit is measured by a under frequency relay and the under frequency relay indicates "OPER" when the frequency is below the preset frequency limit.

11. The system of claim 8, wherein the preset neutral current time is ten minutes.

12. The system of claim 8, wherein the preset phase indicator is 10 amps.

13. The system of claim 8, wherein the automatic restoration system is configured to restore power, and wherein the circuit breaker is in an unset state.

14. A method for automatic power outage restoration, the method comprising:

providing a conversion module, the conversion module receiving relay package input from an electro-mechanical relay package and executing code to convert the relay package input to readable output transmitted to an automatic outage restoration system, receiving the relay package input at the conversion module;

determining, at the conversion module, that a circuit breaker corresponding to the electro-mechanical relay package has not been opened manually;

determining, at the conversion module, that a non-fault scenario has not occurred at the circuit breaker;

determining, at the conversion module, that a time from an opening of the circuit breaker has not been more than a preset time; and outputting a set signal from the conversion module based on the determinations, wherein an automatic outage restoration application resets the circuit breaker based on the set signal.

15. The method of claim 14, wherein the non-fault scenario is a scenario where the circuit breaker trips due to a neutral amperage higher than a preset limit.

16. The method of claim 14, wherein the preset time is sixty seconds.

17. The method of claim 14, further comprising: restoring power proximate to the electro-mechanical relay, wherein the circuit breaker is in an unset state.

18. A non-transitory digital storage medium having a computer program stored thereon to perform the method for automatic power outage restoration, the method comprising:

receiving the relay package input at a conversion module;

determining, at the conversion module, that a circuit breaker corresponding to the electro-mechanical relay package has not been opened manually;

determining, at the conversion module, that a non-fault scenario has not occurred at the circuit breaker;

determining, at the conversion module, that a time from an opening of the circuit breaker has not been more than a preset time; and outputting a set signal from the conversion module based on the determinations, wherein an automatic outage restoration application resets the circuit breaker based on the set signal.

19. A system for automatic power outage restoration, the system comprising:

a circuit breaker;

an electro-mechanical relay package, connected to the circuit breaker;

an automatic outage restoration system, the automatic outage restoration system configured to reset the circuit via the electro-mechanical relay package;

a conversion module, the conversion module receiving relay package input from the electro-mechanical relay package and executing code to convert the relay package input to readable output transmitted to the automatic outage restoration system, the conversion module is configured to receive the relay package input;

determine that a circuit breaker corresponding to the electro-mechanical relay package has not been opened manually;

determine that a non-fault scenario has not occurred at the circuit breaker; determine that a time from an opening of the circuit breaker has not been more than a preset time; and output a set signal from the conversion module based on the determinations, wherein an automatic outage restoration application resets the circuit breaker based on the set signal; wherein the automatic outage restoration system is configured to reset the circuit breaker in response to the set signal.

20. The system of claim 19, wherein the non-fault scenario is a scenario where the circuit breaker trips due to a neutral amperage higher than a preset limit.

21. The system of claim 19, wherein the preset time is less than sixty seconds.

* * * * *